US012263851B2

(12) United States Patent
Teymouri et al.

(10) Patent No.: US 12,263,851 B2
(45) Date of Patent: Apr. 1, 2025

(54) AUTOMATIC LASH LEARN TO IMPROVE VEHICLE DRIVABILITY

(71) Applicant: Rivian IP Holdings, LLC, Irvine, CA (US)

(72) Inventors: Armin Teymouri, Los Angeles, CA (US); Younes Sangsefidi, Irvine, CA (US); Chia-Chou Yeh, Torrance, CA (US); Michael Andrew Miller, San Clemente, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/339,909

(22) Filed: Jun. 22, 2023

(65) Prior Publication Data

US 2024/0425065 A1 Dec. 26, 2024

(51) Int. Cl.
*B60W 50/06* (2006.01)
*B60W 10/04* (2006.01)
*B60W 10/08* (2006.01)
*B60W 30/20* (2006.01)
*F16H 63/50* (2006.01)
*B60W 10/06* (2006.01)

(52) U.S. Cl.
CPC ........... *B60W 50/06* (2013.01); *B60W 10/04* (2013.01); *B60W 30/20* (2013.01); *F16H 63/50* (2013.01); *B60W 10/06* (2013.01); *B60W 10/08* (2013.01); *B60W 2030/206* (2013.01); *B60W 2510/08* (2013.01); *B60W 2520/00* (2013.01); *F16H 2063/508* (2013.01)

(58) Field of Classification Search
CPC ............. B60W 50/06; B60W 2510/08; B60W 2520/00; B60W 30/20; B60W 2030/206; B60W 10/04; B60W 10/06; B60W 10/08; F16H 63/50; F16H 2063/508
See application file for complete search history.

(56) References Cited

U.S. PATENT DOCUMENTS

| | | | | |
|---|---|---|---|---|
| 8,359,144 | B2 * | 1/2013 | Morris | F16H 63/50 701/51 |
| 10,457,291 | B1 * | 10/2019 | Farmer | B60W 40/06 |
| 2008/0257080 | A1 * | 10/2008 | Singh | F16H 25/20 74/89.23 |
| 2010/0114424 | A1 * | 5/2010 | Morris | F16H 59/68 701/51 |
| 2019/0291709 | A1 * | 9/2019 | Liu | B60W 10/06 |

FOREIGN PATENT DOCUMENTS

GB        2602951 A  *  7/2022  .......... B60L 15/2063

* cited by examiner

*Primary Examiner* — Tinh Dang
(74) *Attorney, Agent, or Firm* — BAKERHOSTETLER

(57) ABSTRACT

A vehicle management system includes a torque control generates torque shaping logic for managing torque output of a drive unit and limiting displacement between a drive unit of a vehicle and a wheel coupled to the drive unit. A measuring device monitors a transferred displacement between the drive unit and the wheel coupled to the drive unit when the drive unit is operating to measure a lash angle corresponding to the transferred displacement between the drive unit and the wheel. The measuring device can provide data (e.g., displacement data), indicating the lash angle information, to the vehicle management system. Based on the lash angle information, the torque output generates the torque shaping logic used to manage the torque output of the drive unit.

18 Claims, 6 Drawing Sheets

AUTOMATIC LASH LEARN TO IMPROVE VEHICLE DRIVABILITY

INTRODUCTION

This application relates to monitoring and controlling a lash angle. The lash angle may represent the mechanical displacement or gap between a rotor and a shaft of an electric drive unit. It may be caused by the presence of clearance or play in various components of the drivetrain, and can lead to a number of undesirable effects, such as clunking, vibration, and reduced efficiency.

SUMMARY

This disclosure is generally directed to solving a problem related to vehicle drivability where a driver may experience a torque disturbance during drivability if a lash angle is not configured correctly in the vehicle, thus degrading the drivability experience of the vehicle. The lash angle value is unique to each vehicle that may change over time. The lash angle is calculated and can be learned over time for each vehicle. Small and controlled values of torque may be injected to all the wheels of the vehicle in a stationary mode to estimate the lash angle.

Based on the lash angle, a torque control can provide torque shaping logic (e.g., a torque command) to a drive unit, which may limit or reduce torque disturbance produced by the drive unit. The estimated lash angle can be provided as part of the torque command to adjust the torque output of the motor to compensate for the amount of backlash in the system. The lash angle can be computed over a number of iterations, resulting in a weighted average lash angle that can be used between sleep states (or key cycles) for measuring a new lash angle. This weighted average lash angle value can be stored in memory of the vehicle, such as non-volatile memory. The lash angle measurement may be performed during certain states of the vehicle (e.g., while the vehicle is in idle state just prior to entering a sleep state). The vehicle may use the immediate past lash angle to calculate a new lash angle and perform any torque output adjustments in the next drive. The lash learn algorithm may timeout or abort the operation if certain vehicle conditions are detected (e.g., service, tire change, low spring pressure, etc.). By limiting the torque disturbance, the vehicle drivability can be improved.

In accordance with one or more aspects of the disclosure, a vehicle management system is provided that includes a measuring device that measures a transferred displacement between a drive unit and a wheel coupled to the drive unit, and a torque control configured to obtain, from the measuring device, lash angle information corresponding to the transferred displacement between the drive unit and the wheel, and output, based on the lash angle information, torque shaping logic to the drive unit.

In accordance with one or more aspects of the disclosure, a vehicle is provided that includes a front drive unit; a rear drive unit; a first measuring device that measures a first lash angle associated with the front drive unit; a second measuring device that measures a second lash angle associated with the rear drive unit; and a torque control configured to obtain first lash angle information corresponding to the measured first lash angle and second lash angle information corresponding to the measured second lash angle, determine, based on the first lash angle information, a first torque shaping logic for the front drive unit, determine, based on the second lash angle information, a second torque shaping logic for the rear drive unit, and output the first torque shaping logic to the front drive unit and the second torque shaping logic to the rear drive unit.

In accordance with one or more aspects of the disclosure, a method of managing a vehicle is provided that includes monitoring a transferred displacement between a drive unit and a wheel coupled to the drive unit; measuring a lash angle corresponding to the transferred displacement between the drive unit and the wheel; and sending, based on the measured lash angle, torque shaping logic to the drive unit.

BRIEF DESCRIPTION OF THE DRAWINGS

Certain features of the subject technology are set forth in the appended claims.

However, for purpose of explanation, several embodiments of the subject technology are set forth in the following figures.

DETAILED DESCRIPTION

Figure 1:
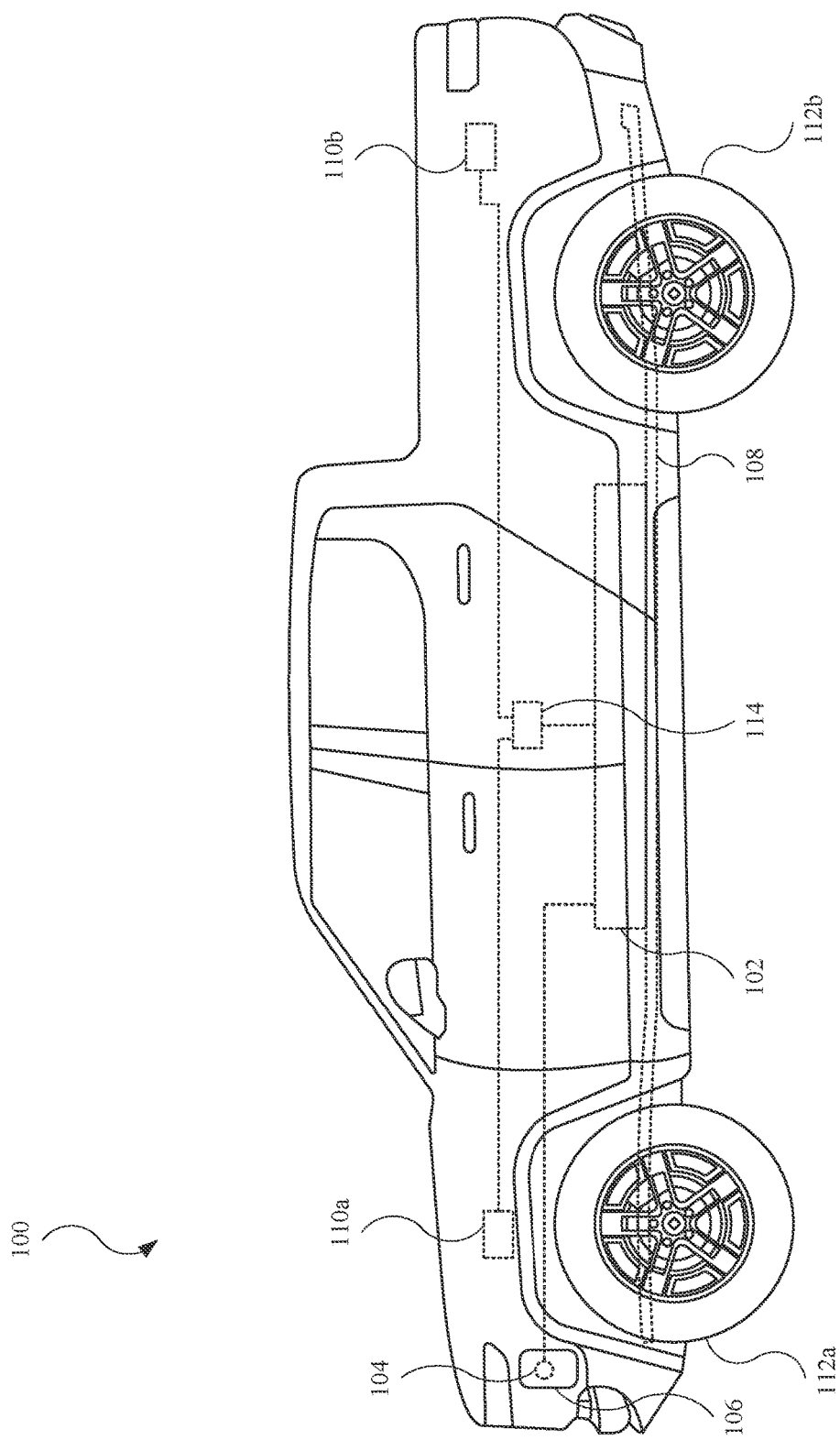
FIG. 1 illustrates an exemplary embodiment of a vehicle, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The lash angle in a vehicle may refer to the mechanical angle between the teeth of the electric motor and the shaft they are connected to. This angle is important for the proper functioning of the motor and its control system, as it determines the timing of the motor's electrical signals and affects the motor's torque output. The controller may need to know the value of lash angle to properly control the motor's torque output.

The lash angle can be determined through calibration of the motor and control system. However, the value of the lash angle is traditionally determined using calibrations using the same lash angle value for all vehicles undergoing calibration, while this lash angle can vary from vehicle to vehicle. Also, the lash angle can change over time as the vehicle keeps driving, so the calibration can vary significantly from the actual lash angle value after some time, resulting in torque disturbances that require adjustments made over time as the vehicle experiences wear and tear.

The subject technology is directed to a vehicle management system for measuring the lash angle during the lifetime of the vehicle to make preemptive adjustments to the motor's torque output, thus preventing the occurrence of torque disturbances as the vehicle experiences wear and tear. By providing a more accurate lash angle value over time, the vehicle drivability experience is improved. The estimated lash angle can be provided as part of an input to the torque shaping logic to adjust the torque output of the motor to compensate for the amount of backlash in the system.

The torque control can use the data for multiple applications. For example, the torque control can use the data as feedback to determine whether to provide torque shaping logic to manage the drive units. During propulsion or regenerative braking events of the vehicle by one or more drive units, a force (e.g., torque) may be applied to the motor shafts. In some instances, the force applied to the shafts causes the shafts to rotate some amount prior to the drive unit engaging a wheel, resulting in a transferred displacement. When the transferred displacement is present, a torque disturbance may be experienced when the drive unit is operating. Beneficially, however, using data from the measuring device(s) as feedback, the torque shaping logic provided by the torque control includes instructions designed to control output (e.g., propulsion, regenerative) of the drive units, thus reducing the transferred displacement between a motor shaft and a wheel, and thus reducing the monitored torque disturbance in the system. Beneficially, by reducing the transferred displacement, the vehicle management system can reduce noise, vibration and harshness (NVH).

According to some embodiments, for example as shown in FIG. 1, an example implementation of a movable apparatus takes the form of a vehicle 100. In some embodiments, the vehicle 100 is a sport utility vehicle. In the embodiment shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, a motorcycle, a motorized scooter, or a commercial truck, as non-limiting examples. Still further, other implementations of the vehicle 100 may include sea or air transport vehicles, planes, helicopters, submarines, boats, or drones, as non-limiting examples.

As shown, the vehicle 100 includes a battery pack 102. The battery pack 102 may be coupled (e.g., electrically coupled) to one or more electrical systems of the vehicle 100 to provide power to the one or more electrical systems. The battery pack 102 may include one or more battery modules (not shown in FIG. 1), with each of the one or more battery modules carrying several battery cells. In some embodiments, the battery pack 102 does not include any battery modules and takes the form of a cell-to-pack configuration. Also, the battery cells of the battery pack 102 may include rechargeable battery cells, and accordingly, the battery pack 102 may be referred to as a rechargeable battery pack. In this regard, the vehicle 100 includes a port 104 (e.g., charge port) designed to receive a cable connector (not shown in FIG. 1) that provides power (e.g., AC power) that is converted to DC power to charge the battery pack 102. The port 104 can be accessed by moving a cover 106. The vehicle 100 may include a chassis 108 used to support the battery pack 102 and various other components (not shown in FIG. 1) of the vehicle 100, such as the suspension and differential, as non-limiting examples.

The battery pack 102 may couple to a drive unit 110a and a drive unit 110b. The drive units 110a and 110b may include, for example, a motor, an inverter, a gear box, and a differential. The drive unit 110a is generally located at the front of the vehicle 100, while the drive unit 110b is generally located at the back of the vehicle 100. Accordingly, the drive unit 110a and the drive unit 110b may be referred to as a front drive unit and a rear drive unit, respectively. While two drive units (e.g., drive units 110a and 110b) are shown, the vehicle 100 may include additional drive units. In some embodiments, each of the drive units 110a and 110b is an internal combustion engine. In the embodiment shown in FIG. 1, each of the drive units 110a and 110b is an electric motor. In this regard, the drive unit 110a and the drive unit 110b can use energy (e.g., electrical energy) stored the battery pack 102 for propulsion in order to drive (e.g., rotationally drive) a wheel 112a and a wheel 112b, respectively. The wheels 112a and 112b each represent an additional front wheel and rear wheel, respectively, of the vehicle 100. By driving the wheels 112a and 112b, the vehicle 100 can move in various directions.

Also, the vehicle 100 may further include a vehicle management system 114 designed to provide torque commands to the drive units 110a and 110b. The drive units 110a and 110b may operate in accordance with the torque shaping logic provided by the vehicle management system 114. In this regard, the drive units 110a and 110b can generate, based on the torque shaping logic, a torque output provided to the wheels 112a and 112b, respectively, that dictate the speed at which the vehicle 100 is traveling.

The subject technology addresses a problem related to vehicle drivability where a driver may experience a torque disturbance during drivability if a lash angle is not configured correctly in the vehicle 100, thus degrading the drivability experience of the vehicle 100. The lash angle value may be unique to each vehicle that may change over time. The lash angle may be measured in degrees or radians, and represents the angle through which a rotor can move relative to a shaft before contact is made. This angle is influenced by a variety of factors, including the design and manufacturing tolerances of the various drivetrain components, the wear and tear that occurs over time, and the operating conditions of the vehicle 100.

By monitoring and controlling the lash angle, the vehicle management system 114 can reduce the occurrence of unwanted effects and improve the overall performance and efficiency of the electric drive unit. This can be accomplished by adjusting the torque output of the drive units 110a and 110b to compensate for the play or clearance in the drivetrain, and bring the rotor and shaft into closer alignment. For example, the estimated lash angle can be provided as part of a torque command, via the torque shaping logic, to adjust the torque output of the drive units 110a and 110b to compensate for the amount of backlash in the system. Small and controlled values of torque may be injected to all the wheels (e.g., 112a and 112b) of the vehicle 100 to estimate the lash angle.

In some implementations, the lash angle can be computed over a number of iterations, resulting in a weighted average lash angle that can be used between sleep states (or key cycles) for measuring a new lash angle. The lash angle is calculated and can be learned over time for each vehicle. In some implementations, this weighted average lash angle value can be stored in memory of the vehicle 100, such as non-volatile memory. The lash angle measurement may be performed during certain states of the vehicle 100 (e.g., while the vehicle 100 is in idle state just prior to entering a sleep state). The vehicle 100 may use the immediate past driving metrics (e.g., speed and torque signatures) to calculate the lash angle and perform any torque output adjustments in the next drive. The lash learn algorithm may timeout or abort the operation if certain vehicle conditions are detected (e.g., service, tire change, low spring pressure, etc.).

Figure 2:
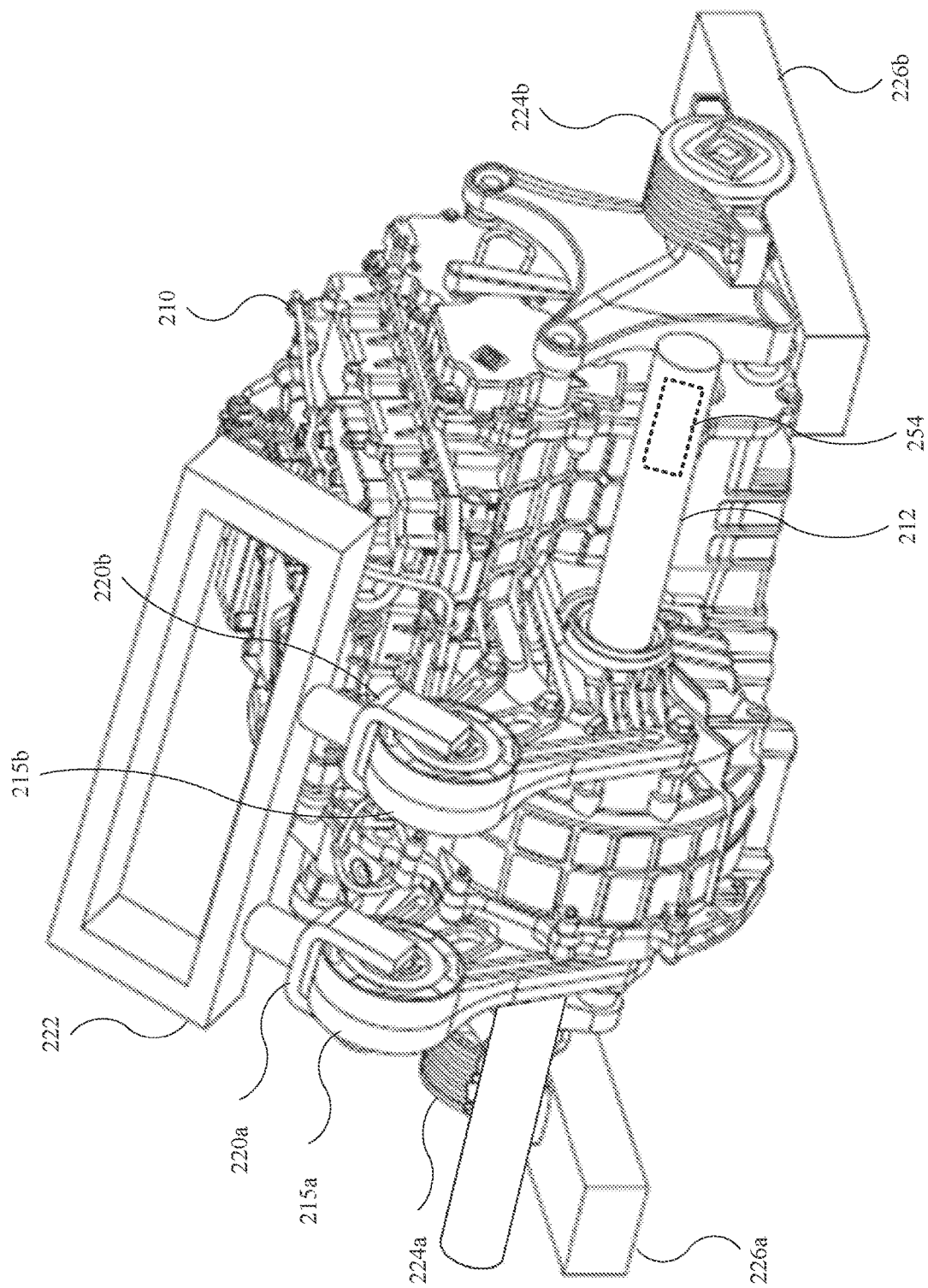
FIG. 2 illustrates a perspective view of a drive unit, in accordance with aspects of the present disclosure.

Referring to FIG. 2, a drive unit 210 is shown. The drive unit 210 may include, for example, a motor, an inverter, a gear box, or a differential, as non-limiting examples. In order to secure the drive unit 210 to a vehicle (e.g., vehicle 100, shown in FIG. 1), several components are used. For example, a bracket 215*a* and a bracket 215*b* extend from the drive unit 210. Clevises 220*a* and 220*b* are connected to a crossmember 222, which can be secured to a frame (not shown) of a vehicle. Additionally, the drive unit 210 may include a mount 224*a* and a mount 224*b*, each of which can be secured to a subframe 226*a* and a subframe 226*b*, respectively.

The drive unit 210 can drive (e.g., rotationally drive) a shaft 212 that is coupled to a wheel (not shown in FIG. 2). However, the applied torque to the shaft 212 by the drive unit 210 can impact the shaft 212 such that a transferred displacement between the shaft 212 and the wheel (not shown) can occur. In some aspects, the shaft 212 is a mechanical component that connects the electric motor (e.g., the drive unit 210) to other components in the drivetrain, such as the transmission or differential. It is responsible for transmitting torque from the drive unit 210 to the wheels of the vehicle 100, and can be designed to withstand high stresses and loads that are generated during normal driving conditions.

The subject technology addresses this problem related to vehicle drivability where a driver may experience a torque disturbance during drivability if a lash angle is not configured correctly in the vehicle 100, thus degrading the drivability experience of the vehicle 100. In some aspects, the transferred displacement may refer to an angular or rotational displacement between two connected components (e.g., the shaft 212 and the wheel). When the electric motor in the drive unit 210 generates torque, that torque is transferred through the drivetrain components (such as gears, shafts (e.g., shaft 212), or a direct drive system) to the wheel. As a result, the wheel experiences a displacement or movement, typically rotational, in response to the torque applied by the drive unit 210.

In a vehicle with an electric motor and direct drive transmission, the drive unit 210 may be communicatively coupled to a torque controller (not shown), which can receive input signals such as throttle position, vehicle speed, and regenerative braking demand, and uses these inputs to adjust the torque output of the drive unit 210. In some implementations, the torque controller may be implemented as, or include at least a portion of, the vehicle management system 114. In addition, a lash angle sensor can be added to provide the vehicle management system 114 with additional information about the position of the drive unit's shaft and the amount of slack or play in the drive unit 210.

In some implementations, the drive unit 210 may include, or be at least in part coupled to, a measuring device 254 that that measures the transferred displacement between the drive unit 210 and a wheel coupled to the drive unit 210 (via the shaft 212). In some implementations, the measuring device 254 may measure the transferred displacement between the drive unit 210 and the wheel between different key cycles. In some implementations, the measuring device 254 may measure a difference between a first rotational angle of a shaft (e.g., shaft 212) in the drive unit 210 and a second rotational angle of the wheel coupled to the drive unit 210. In some aspects, the measured difference corresponds to the transferred displacement between the drive unit 210 and the wheel.

In some implementations, the measuring device 254 includes a lash angle sensor that takes the form of a rotary position sensor installed within the drive unit 210. In some aspects, the lash angle sensor may consist of a hall effect sensor or other type of magnetic sensor that detects the position of a magnet mounted on a shaft (e.g., shaft 212). For example, the lash angle sensor may be configured to measure a position of a magnet mounted on a shaft in the drive unit 210 and detect that the shaft 212 has rotated a measured amount before the drive unit 210 engages the wheel (e.g., representing backlash in the drive unit 210). As the shaft 212 rotates, the lash angle sensor can detect the position of the magnet and sends this information to the vehicle management system 114. The lash angle information provided by the lash angle sensor can be used to help resolve for backlash in the drive unit 210.

Backlash may refer to the amount of play or looseness in the rotational components of the drive unit 210. When there is a significant amount of backlash, the shaft and rotor may not be tightly engaged with each other and can cause a sudden change in torque as the drive unit 210 engages or disengages, resulting in a sudden jolt or "clunk" sensation felt by the driver and passengers. To resolve for backlash, the lash angle information can be used to adjust the torque output of the drive unit 210 during operation. When the shaft 212 rotates and the lash angle sensor detects that the drive unit 210 is engaging, the vehicle management system 114 can adjust the torque output of the drive unit 210 for a brief period of time to compensate for the backlash.

In some aspects, the lash angle sensor may be an electromagnetic sensor such as a resolver that includes a stator connected to a shaft of the drive unit 210 (e.g., shaft 212) and a rotor (not shown) connected to the wheel. In some aspects, the rotor is a rotating component of the drive unit 210 that is typically located inside a stator assembly (not shown). It may be responsible for generating the magnetic fields that interact with the stator windings to produce rotational motion. In some implementations, the rotor and the shaft 212 may be integrated into a single component. In other implementations, the rotor and the shaft 212 may be separate components that are connected by a coupling or other mechanism.

The lash angle sensor as the resolver can detect the relative angle between the rotor and the stator, allowing the measurement of the lash angle. The lash angle can be expressed mathematically as the difference between an encoder angle and a resolver angle, minus the amount of backlash in the system. This can be written as expression (1) reproduced below:

$$\text{Lash angle} = (\text{Encoder angle} - \text{Resolver angle}) - \text{Backlash} \quad (1),$$

where the encoder angle refers to the measured position and angle of the shaft 212; the resolver angle refers to the measured position and angle of the rotor; and the backlash is the amount of play or slack in the gears and other components of the drive unit 210.

In some aspects, the resolver angle also may refer to a measurement of the position and orientation of the rotor in an electric motor. It may be obtained using a resolver sensor, which is a type of rotary transformer that can detect the magnetic fields of the drive unit's rotor and stator. The resolver angle can be used in combination with the encoder angle to compute the lash angle in the drive unit 210.

To compute the lash angle, the resolver angle and encoder angle may be first converted to electrical signals by their respective sensors. These signals can then be processed by the vehicle management system 114, which compares the positions of the motor's shaft and rotor at different points in time to determine the amount of rotation that has occurred in the drive unit 210. The vehicle management system 114 can then use this information to compute the lash angle. This calculation can be used to adjust the torque output of the drive unit 210 during operation to compensate for any sudden changes in torque caused by the slack.

If the backlash value is known and remains constant, and a fixed K coefficient is used to account for any elasticity or deformation in the drive unit 210, the mathematical expression for the lash angle can be simplified as expression (2) reproduced below:

$$\text{Lash angle} = K \times (\text{Encoder angle} - \text{Resolver angle}) - \text{Backlash} \quad (2),$$

where K is the fixed coefficient that accounts for elasticity or deformation in the drive unit 210. This coefficient may be predetermined or may be determined by measuring the response of the drive unit 210 to changes in torque and other inputs.

In other aspects, the lash angle sensor may be an encoder that includes a disc with evenly spaced markings and a sensor that detects changes in the disc's position. By measuring the changes in the disc's position as the shaft 212 rotates, the lash angle sensor can provide information about the lash angle. In still other aspects, the lash angle sensor may be a magnetic sensor that can detect changes in a magnetic field. For example, a magnet may be placed on a shaft (e.g., shaft 212) and the lash angle sensor as a magnetic sensor can measure the change in magnetic field between the shaft and the wheel as the shaft rotates.

In some implementations, the drive unit 210 may include, or be at least in part coupled to, a torque control (not shown) that is configured to obtain, from the measuring device 254, lash angle information corresponding to the transferred displacement between the drive unit 210 and the wheel. The torque control may output, based on the lash angle information, torque shaping logic to the drive unit 210. The estimated lash angle can be provided as part of a torque command, via the torque shaping logic, to adjust the torque output of the drive unit 210 to compensate for the amount of backlash in the system.

Figure 3:
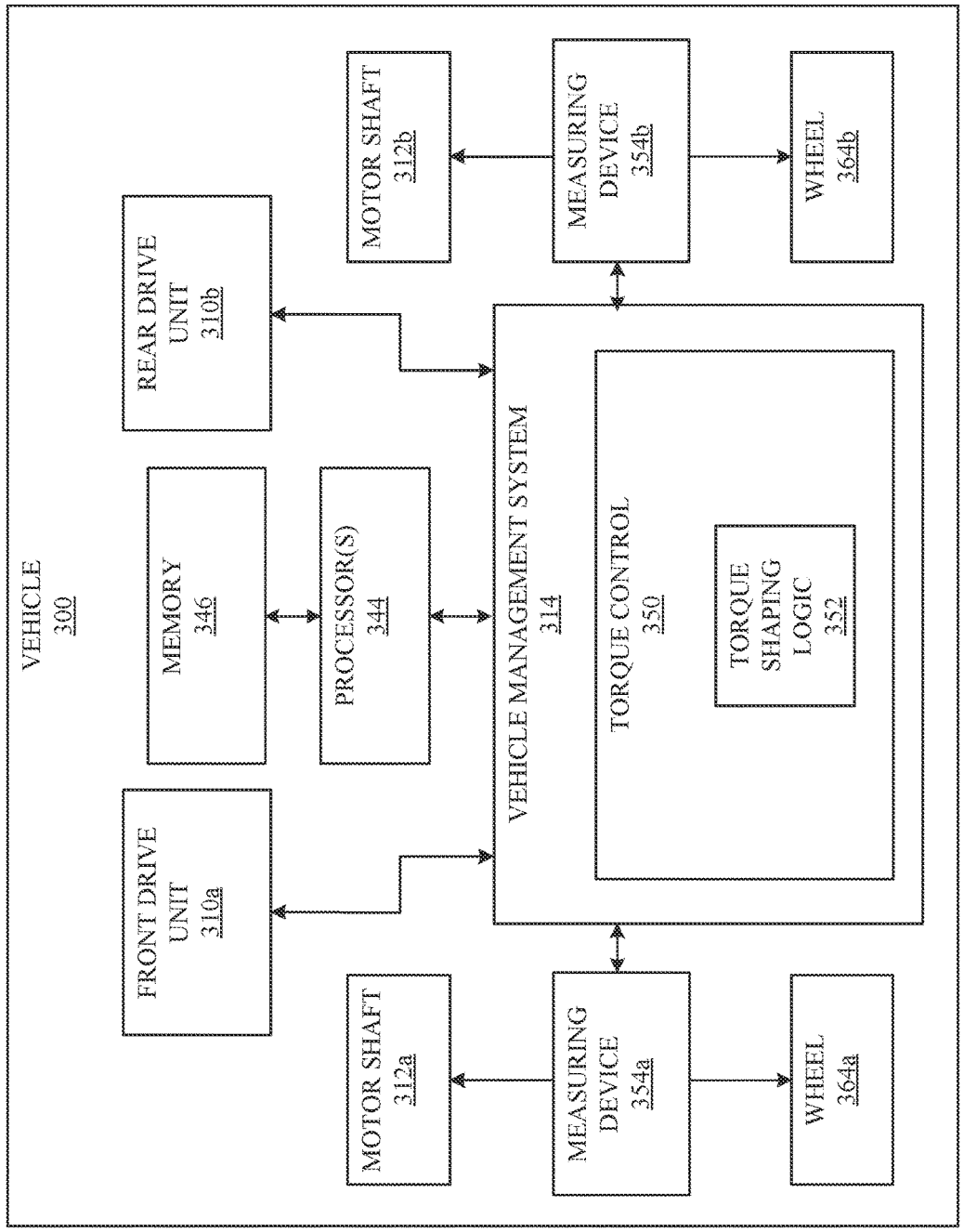
FIG. 3 illustrates a block diagram of a vehicle, in accordance with aspects of the present disclosure.

Referring to FIG. 3, a block diagram of a vehicle 300 is shown. The features shown and described herein for the vehicle 300 may be applicable to other vehicles shown and/or described herein. As shown, the vehicle 300 includes a front drive unit 310a and a rear drive unit 310b, each of which can be operated by a vehicle management system 314 (discussed further below) of the vehicle 300. The vehicle 300 may further include a motor shaft 312a (representative of one or more shafts) used with the front drive unit 310a. The vehicle 300 may further include a motor shaft 312b (representative of one or more shafts) used with the rear drive unit 310b. The motor shaft 312a may be coupled to a wheel 364a (representative of one or more wheels) and the motor shaft 312b may be coupled to a wheel 364b (representative of one or more wheels).

The vehicle 300 further includes one or more processors 344. The one or more processors 344 may include processing circuitry that takes the form of a central processing unit, one or more microcontrollers, one or more micro electromechanical system (MEMS) controllers, or a combination thereof, as non-limiting examples. The vehicle 300 further includes memory 346. The memory 346 may include read-only memory (ROM), random access memory (RAM), or a combination thereof. The memory 346 may store instructions that are executable by the one or more processors 344. In some implementations, the memory 346, at least in part, may include non-volatile memory (NVM).

The vehicle management system 314 is designed to monitor the motor shafts 312a and 312b and manage the front drive unit 310a and the rear drive unit 310b based on monitoring the motor shafts 312a and 312b. Particularly, the vehicle management system 314 is designed to monitor any angular or rotational displacement occurrence between the motor shaft 312a and the wheel 364a, and/or any angular or rotational displacement occurrence between the motor shaft 312b and the wheel 364b.

The vehicle management system 314 may include a torque control 350 designed to generate and provide torque shaping logic 352 to the front drive unit 310a and the rear drive unit 310b. The torque shaping logic 352 may include one or more torque commands provided as instructions to the front drive unit 310a and the rear drive unit 310b that instructs the front drive unit 310a and the rear drive unit 310b to generate a specified torque output, in accordance with the instructions, to propel the vehicle by driving wheels (not shown) of the vehicle 300. Also, the vehicle management system 314 implemented in hardware (e.g., by the one or more processors 344). Alternatively, or in combination, the vehicle management system 314 may be implemented in software and stored on the memory 346.

Additionally, the vehicle 300 may include a measuring device 354a (representative of one or more measuring devices) designed to measure a first lash angle associated with the front drive unit 310a. In some aspects, the first lash angle may be representative of a measured displacement between the motor shaft 312a and the wheel 364a. Additionally, the vehicle 300 may include a measuring device 354b (representative of one or more measuring devices) designed to measure a second lash angle associated with the rear drive unit 310b. In some aspects, the second lash angle may be representative of a measured displacement between the motor shaft 312b and the wheel 364b. However, multiple measuring devices (further described below) may be used to monitor the transferred displacement between a shaft and a wheel.

In some implementations, the measuring device 354a may measure a difference between a first rotational angle of the motor shaft 312a in the front drive unit 310a and a second rotational angle of the wheel 364a coupled to the front drive unit 310a when the front drive unit 310a is operating. Similarly, for example, the measuring device 354b may measure a difference between a first rotational angle of the motor shaft 312b in the rear drive unit 310b and a second rotational angle of the wheel 364b coupled to the rear drive unit 310b when the rear drive unit 310b is operating. In some aspects, the measured difference corresponds to the transferred displacement between a drive unit and a wheel.

In some implementations, the measuring devices 354a and 354b may each monitor for and measure any transferred displacement in the system during certain states of the vehicle 300. For example, the measuring device 354a may measure the transferred displacement between the front drive unit 310a and the wheel 364a when the vehicle 300 is in a locked state and greater than a threshold amount of time has passed since the vehicle 300 transitioned into the locked state and prior to the vehicle 300 transitioning into a sleep state. Similarly, for example, the measuring device 354b may measure the transferred displacement between the rear drive unit 310b and the wheel 364b when the vehicle 300 is in a locked state and greater than a threshold amount of time has passed since the vehicle 300 transitioned into the locked state and prior to the vehicle 300 transitioning into a sleep state.

The measuring device 354a and the measuring device 354b can provide data (e.g., displacement data) to the vehicle management system 314. Based on the data, the torque control 350 can generate torque shaping logic 352 used to adjust the torque output of the front drive unit 310a and the rear drive unit 310b. When the data indicates the presence of an angular displacement between a shaft (e.g., the shaft 312a, 312b) and a wheel (e.g., wheel 364a, 364b), the torque control 350 generates the torque shaping logic 352, which includes instructions provided to the front drive unit 310a and the rear drive unit 310b to adjust (e.g., decrease or reduce) the respective torque output, thus adjusting the rotational force provided to the wheels and adjusting the speed of the vehicle 300. For example, the torque shaping logic 352 (e.g., a first torque shaping logic) can cause the front drive unit 310a to operate the wheel 364a with a first adjustment in torque output of the front drive unit 310a that corresponds to a measured first lash angle. Similarly, for example, the torque shaping logic 352 (e.g., a second torque shaping logic) can cause the rear drive unit 310b to operate the wheel 364b with a second adjustment in torque output of the rear drive unit 310b that corresponds to a measured second lash angle.

Beneficially, the angular displacement between a shaft and a wheel is reduced to a displacement at below a threshold displacement such that any torque disturbance caused directly by the presence of the angular displacement can be reduced. Accordingly, using the torque shaping logic 352, the torque control 350 can maintain the front drive unit 310a and the rear drive unit 310b to within a motion envelop such that each of the front drive unit 310a and the rear drive unit 310b does not exceed a specified torque output associated with a threshold displacement of the motor shafts 312a and 312b.

The torque shaping logic 352 may include individual or separate instructions for the front drive unit 310a and the rear drive unit 310b. For example, when the measuring device 354a provides data to the torque control 350 indicating a measured displacement between the motor shaft 312a and the wheel 364a but the measuring device 354b provides data to the torque control 350 indicating no measured displacement between the motor shaft 312b and the wheel 364b, the torque control 350 may generate torque shaping logic 352 with instructions provided only to the front drive unit 310a to adjust the torque output of the front drive unit 310a. In another example, when each of the measuring device 354a and measuring device 354b provides data to the torque control 350 indicating a measured displacement associated with the motor shaft 312a and the motor shaft 312b, respectively, the torque control 350 may generate torque shaping logic 352 with instructions provided only to one of the front drive unit 310a and the rear drive unit 310b to adjust the torque output, provided the adjustment in the torque output (to one of the front drive unit 310a and the rear drive unit 310b) causes the measured displacement with respect to the motor shafts 312a and 312b to decrease (e.g., to below a threshold displacement).

In some implementations, the measuring device 354a is configured to measure the transferred displacement between the front drive unit 310a and the wheel 364a (via the motor shaft 312a) between different key cycles. Similarly, the measuring device 354b is configured to measure the transferred displacement between the rear drive unit 310b and the wheel 364b (via the motor shaft 312b) between different key cycles. In some implementations, the torque control 350 is configured to update the torque shaping logic 352 with updated lash angle information between different key cycles.

In some aspects, the term "key cycle" refers to the process of turning the vehicle's power on and off. It may involve activating the electrical systems of the vehicle 300 by pressing a start button or turning a key-like switch, and subsequently deactivating the power by performing the same action in reverse. When a key cycle is initiated in an electric vehicle (e.g., the vehicle 300), it may involve the activation of the vehicle's onboard computers, control systems, and electrical components (via the vehicle management system 314). This allows the vehicle 300 to enter its operational state, where it can perform functions such as displaying information on an instrument cluster, powering auxiliary systems, and preparing for driving. Conversely, when the key cycle is completed, the power to the vehicle's systems is turned off, putting the vehicle 300 in a standby or power-off state. This can involve shutting down the onboard computers, deactivating electrical components, and discontinuing power supply to various systems in the vehicle 300.

In some implementations, the torque control 350 may store all, or at least in part, the lash angle information as historical lash angle information in the memory 346. In some aspects, at least a portion of the lash angle information stored in the memory 346 is associated with a first key cycle. The torque control 350 may obtain updated measurements of the transferred displacement between a drive unit (e.g., the front drive unit 310a, rear drive unit 310b) and a wheel (e.g., the wheel 364a, 364b, respectively) during a second key cycle different than the first key cycle. The torque control 350 may generate, based on the updated measurements and the historical lash angle information, a weighted average of the lash angle information. In some implementations, this weighted average lash angle value can be stored in at least a portion of the memory 346, such as non-volatile memory. The torque control 350 may update, based on the weighted average of the lash angle information, the torque shaping logic 352 to a drive unit (e.g., the front drive unit 310a, rear drive unit 310b). In one or more implementations, the torque control 350 may calculate the weighted average lash angle by computing the lash angle over a number of iterations. In some aspects, new lash angle measurements may be assigned a smaller weight than previous lash angle measurements such that the prior weighted average carries more weight in the final calculated value. In other aspects, lash angle measurements obtained more frequently than other lash angle measurements may be assigned a smaller weight such that the prior weighted average carries more weight overall. In one or more implementations, the torque control 350 may calculate a new lash angle between different key cycles based on the weighted average lash angle.

In some implementations, the vehicle management system 314 is activated in certain situations. For example, when the vehicle 300 is placed on cruise control (e.g., automated consistent speed) or certain drive modes (e.g., comfort mode), the torque control 350 is activated to generate torque shaping logic 352 to manage the front drive unit 310a and the rear drive unit 310b, thus, the vehicle management system 314 may be implemented based upon predetermined conditions.

In some implementations, the torque control 350 may operate in lash mode. The "lash mode" of operation may refer to a specific control strategy used by the vehicle management system 314 to reduce or eliminate the clunking sound and other unwanted effects that can occur when there is slack or play in the drivetrain. During the lash mode, the vehicle management system 314 can apply a small amount of torque to a motor shaft (e.g., the motor shaft 312a and/or 312b) in the opposite direction of rotation, which may help to decrease any slack in the drive unit and reduce the free play between the gears and other components. By compensating for the measured lash angle, the vehicle management system 314 can improve the overall drivability and smoothness of the vehicle 300.

In other implementations, the torque control 350 may operate in contact mode. The "contact mode" of operation may refer to a specific control strategy used by the vehicle management system 314 to improve the responsiveness and efficiency of the drivetrain by reducing the amount of mechanical play or slack in the drive unit. During contact mode, the vehicle management system 314 may apply a small amount of torque to a motor shaft (e.g., the motor shaft 312a and/or 312b) in the same direction of rotation as the vehicle's motion, which creates a "pre-load" or contact force between the gears and other components of the drivetrain. This pre-load can help to reduce the amount of mechanical play or backlash in the drive unit, which can improve the overall efficiency of the drivetrain and reduce the wear and tear on its components. Contact mode may be used in situations where high levels of torque and power are required, such as during rapid acceleration or high-speed driving. By reducing the amount of play in the drive unit, the vehicle management system 314 can improve the responsiveness and performance of the drivetrain, and help to ensure that the drive unit and other components operate at optimal efficiency.

Figure 4:
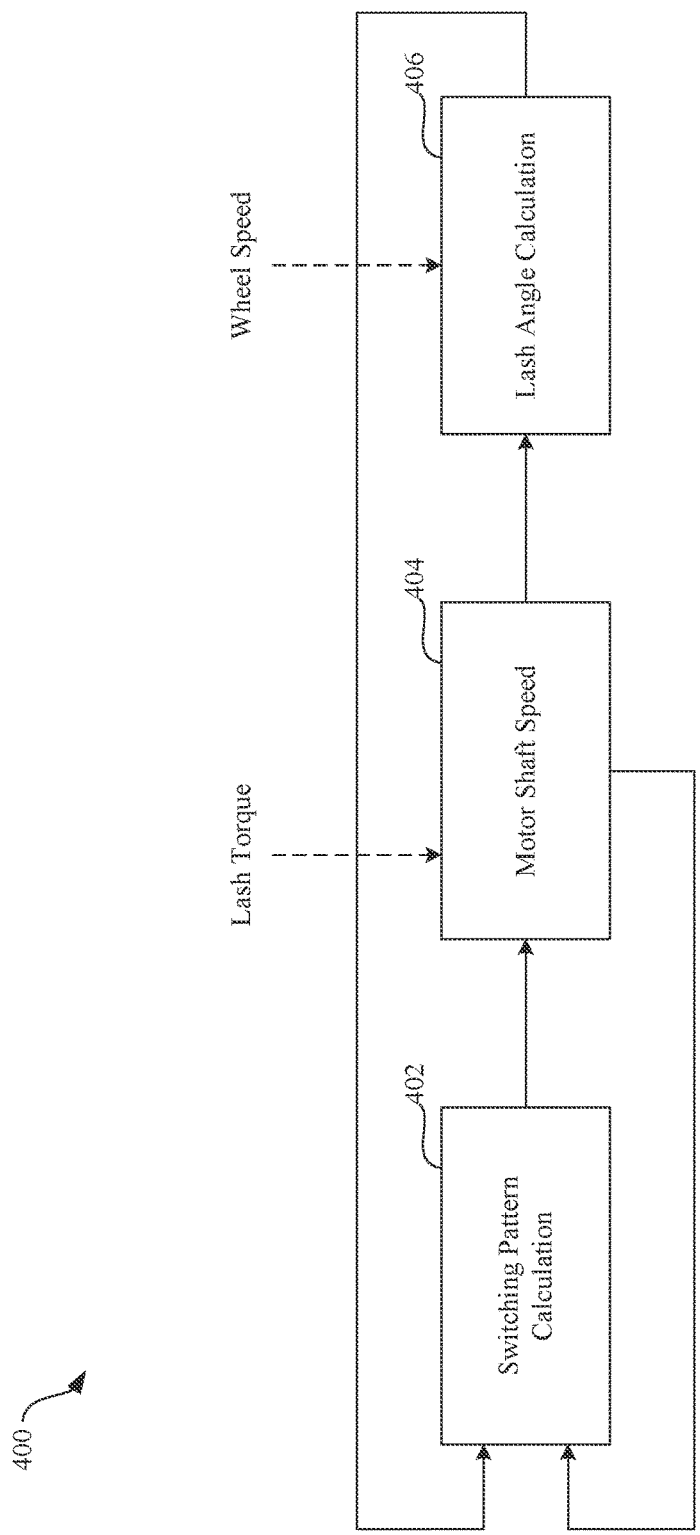
FIG. 4 illustrates a flow diagram for performing automatic lash learning, in accordance with aspects of the present disclosure.

FIG. 4 illustrates a flow diagram 400 for performing automatic lash learning, in accordance with aspects of the present disclosure. In particular, the flow diagram 400 includes a switching pattern calculation component 402 communicatively coupled to a motor shaft speed component 404 and to a lash angle calculation component 406.

The switching pattern calculation 402 may provide a switching pattern to the motor shaft speed component 404. In some aspects, the switching pattern in an electric motor drive system refers to the specific sequence of pulses that are applied to the drive unit's windings to control its speed and torque. This pattern may be generated by a pulse width modulation (PWM) controller, which can adjust the width and timing of the pulses based on the desired speed and torque of the drive unit.

The motor shaft speed component 404 may feed a motor shaft speed value to the lash angle calculation component 406. The motor shaft speed value also may be fed to the switching pattern calculation component 402. The motor shaft speed component 404 may receive a lash torque value as input. To calculate the motor shaft speed from the switching pattern, the motor shaft speed component 404 may use a number of different approaches, depending on the specific characteristics of the drive unit (e.g., 210) and the vehicle management system 314. In some aspects, the motor shaft speed component 404 may use a combination of feedback and control algorithms to estimate the speed of the drive unit based on the current and voltage signals generated by the drive unit and the PWM controller. For example, a speed sensor such as an encoder or resolver can be used to provide feedback on the actual speed of the drive unit, which can be compared to a desired speed setpoint to calculate the error between the two. This error signal can then be used to adjust the switching pattern in real-time, to bring the drive unit speed closer to the desired setpoint. In other implementations, a model-based control approach (not shown) can be used to estimate the drive unit speed based on a mathematical model of the drive unit and the vehicle management system 314, using inputs such as the switching pattern, current and voltage signals, and other parameters. To compute the motor shaft speed using a lash torque value, the vehicle management system 314 can use a mathematical model of the motor and the transmission system to estimate the actual torque being transmitted to the load, based on the measured motor current, voltage, and other parameters. The estimated load torque can then be subtracted from the desired torque setpoint to calculate the amount of torque required to overcome the lash in the system (e.g., the lash angle value).

The lash angle calculation component 406 may determine a lash angle value and provide the lash angle value back to the switching pattern calculation component 402. The lash angle calculation component 406 may receive a wheel speed value as input. Lash angle value may correspond to the amount of torque that is required to overcome the slack or play in the gears and other components of the drive unit, before the drive unit output torque can be effectively transmitted to the load. This torque value can be computed by measuring the difference between the torque applied to the motor shaft and the torque that is actually transmitted to the load, and subtracting any other sources of torque loss in the system.

The wheel speed may be representative of the vehicle reference speed. The vehicle reference speed can be an input parameter used in the calculation of the lash angle in an electric vehicle. This vehicle reference speed value can be measured using a speed sensor, such as a wheel speed sensor, and represents the actual speed of the vehicle as it travels along the road.

To calculate the lash angle, the lash angle calculation component 406 can first determine the actual speed of the motor shaft. This is typically done using a combination of information from the resolver angle and the switching pattern of the motor controller. By using the vehicle reference speed as a benchmark for the motor shaft speed, the vehicle management system 314 can ensure that the drivetrain is operating at optimal efficiency and performance, and can reduce the occurrence of clunking and other unwanted effects caused by lash or play in the drive unit.

Once the motor shaft speed has been determined, the controller can then calculate the lash angle by comparing the actual speed of the motor shaft to the vehicle reference speed. If the motor shaft speed is lower than the vehicle reference speed, this indicates that there is slack or play in the drivetrain, and the vehicle management system 314 can apply a small amount of torque in the opposite direction of rotation to take up the slack and reduce the lash angle. Conversely, if the motor shaft speed is higher than the vehicle reference speed, this indicates that there is too much tension or compression in the drivetrain, and the vehicle management system 314 can adjust the torque output to reduce the tension and bring the motor shaft speed back in line with the reference speed.

Once the lash angle value has been computed, it can be used to adjust the torque output of the drive unit during gear changes and other transitions, to compensate for any sudden changes in torque caused by the slack in the drive unit. By accounting for the lash angle, the vehicle management system 314 can help reduce clunk and other unwanted effects in electric vehicles, and improve the overall drivability and performance of the system.

Figure 5:
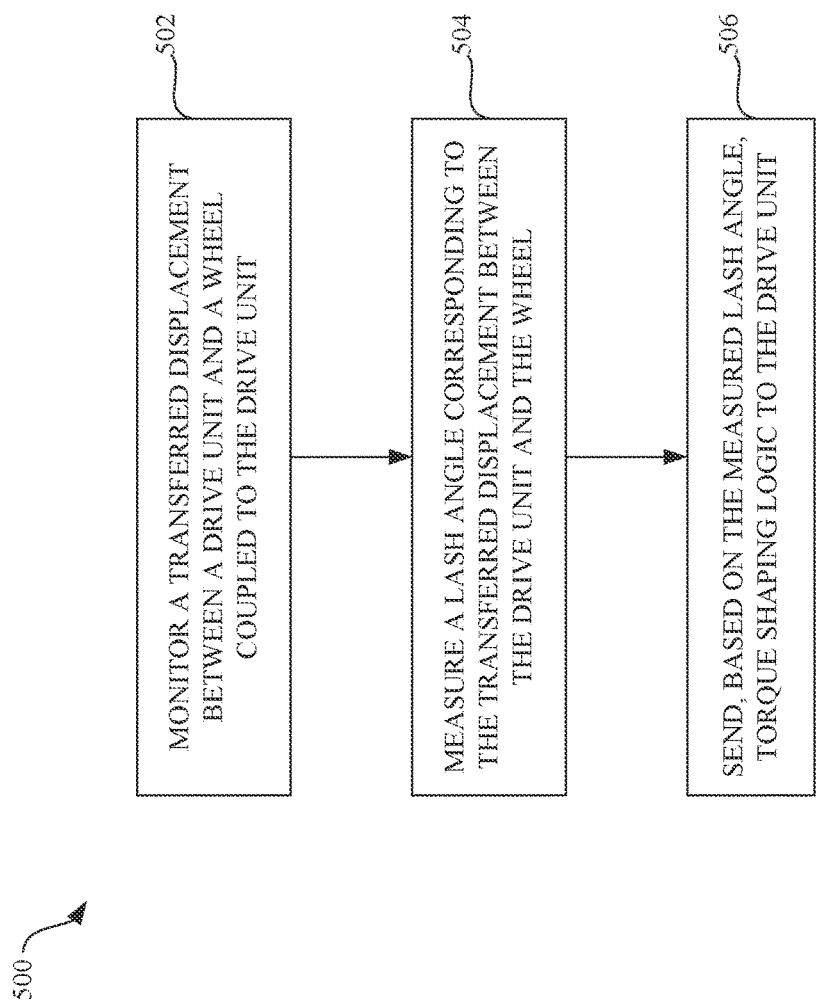
FIG. 5 illustrates a flow diagram for managing a vehicle, in accordance with aspects of the present disclosure.

Referring to FIG. 5, a flow diagram 500 for managing a vehicle is shown. In particular, the flow diagram 500 may be used to manage a drive unit (or drive units) of the vehicle by responding to displacement between a motor shaft and a wheel coupled to the drive unit. Further, the flow diagram 500 may be implemented by a vehicle management system shown and/or described herein. For explanatory purposes, the process 500 is primarily described herein with reference to the vehicle 100 of FIGS. 1 and 2, and/or various components thereof. However, the process 500 is not limited to the vehicle 100 of FIG. 1, and one or more blocks (or operations) of the process 500 may be performed by one or more other structural components of the vehicle 100 and/or of other suitable moveable apparatuses, devices, or systems. Further, for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, the process 500 includes monitoring a transferred displacement between a drive unit and a wheel coupled to the drive unit. In some aspects, the transferred displacement may be monitored by a measuring device. The measuring device may be selected from one or more of the measuring devices shown and/or described herein. In one or more implementations, the transferred displacement between the drive unit and the wheel is monitored between different key cycles.

At block step 504, the process 500 includes measuring a lash angle corresponding to the transferred displacement between the drive unit and the wheel.

In some implementations, the process 500 includes measuring a position of a magnet mounted on a shaft in the drive unit, and detecting that the shaft has rotated a measured amount before the drive unit engages the wheel. In some implementations, the process 500 includes measuring a difference between a first rotational angle of a shaft in the drive unit and a second rotational angle of the wheel coupled to the drive unit. In some aspects, the measured difference corresponds to the transferred displacement between the drive unit and the wheel.

In some implementations, the process 500 includes measuring the transferred displacement between the drive unit and the wheel when a vehicle is in a locked state and greater than a threshold amount of time has passed since the vehicle transitioned into the locked state and prior to the vehicle transitioning into a sleep state.

In some implementations, the process 500 includes updating the torque shaping logic with updated lash angle information between different key cycles. In some implementations, the process 500 includes calculating a new lash angle between different key cycles based on a weighted average lash angle.

In some implementations, the process 500 includes storing lash angle information comprising the measured lash angle as historical lash angle information. In some aspects, at least a portion of the stored lash angle information is associated with a first key cycle. The process 500 also includes obtaining updated measurements of the transferred displacement between the drive unit and the wheel during a second key cycle different than the first key cycle. In some implementations, the process 500 includes generating, based on the updated measurements and the historical lash angle information, a weighted average of the lash angle information. In some implementations, the process 500 calculating the weighted average lash angle by computing the lash angle over a number of iterations. In some implementations, the process 500 includes updating, based on the weighted average of the lash angle information, the torque shaping logic to the drive unit.

At block 506, the process 500 includes sending, based on the measured lash angle, torque shaping logic to the drive unit.

Figure 6:
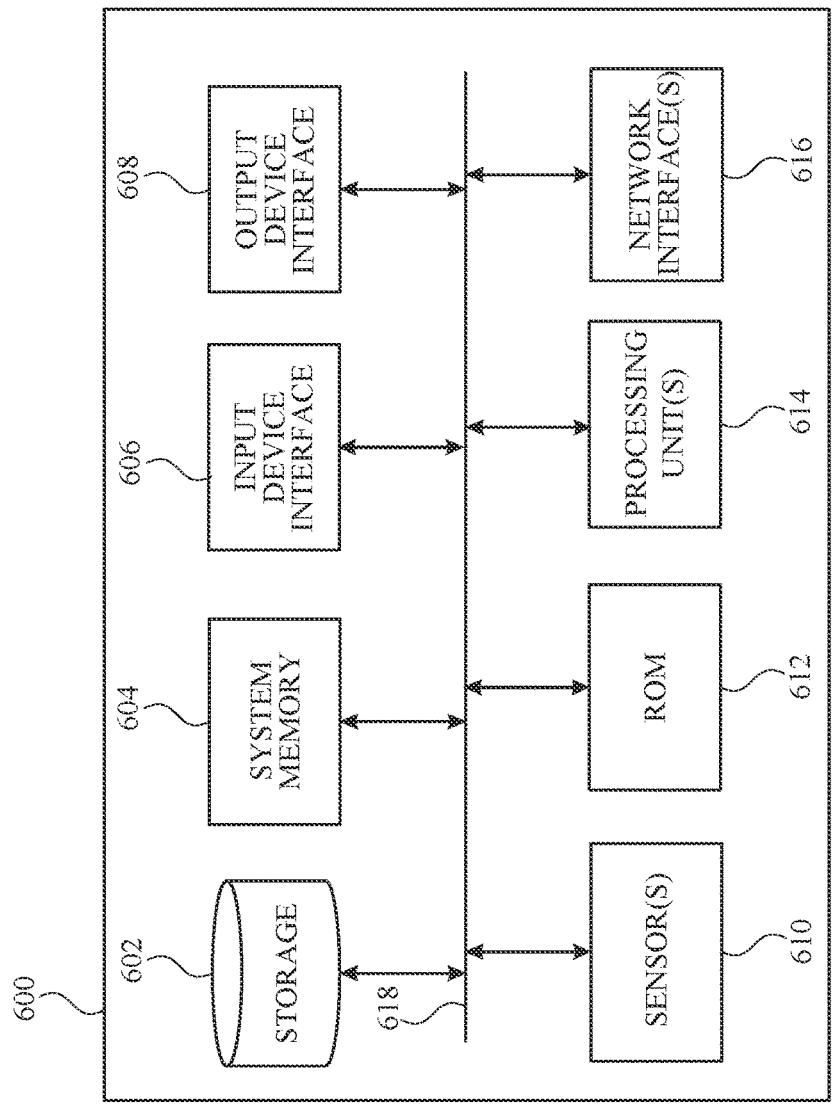
FIG. 6 illustrates an electronic system with which one or more implementations of the subject technology may be implemented.

FIG. 6 illustrates an example electronic system 600 with which aspects of the present disclosure may be implemented. The electronic system 600 can be, and/or can be a part of, any electronic device for providing the features and performing processes described in reference to FIGS. 1-3, including but not limited to a vehicle, computer, server, smartphone, and wearable device (e.g., authentication device). The electronic system 600 may include various types of computer-readable media and interfaces for various other types of computer-readable media. The electronic system 600 includes a persistent storage device 602, system memory 604 (and/or buffer), input device interface 606, output device interface 608, sensor(s) 610, ROM 612, processing unit(s) 614, network interface 616, bus 618, and/or subsets and variations thereof.

The bus 618 collectively represents all system, peripheral, and chipset buses that communicatively connect the numerous internal devices and/or components of the electronic system 600, such as any of the components of the vehicle 100 discussed above with respect to FIG. 2. In one or more implementations, the bus 618 communicatively connects the one or more processing unit(s) 614 with the ROM 612, the system memory 604, and the persistent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations. In one or more implementations, one or more of the processing unit(s) 614 may be included on an ECU 204, such as in the form of the processor 206.

The ROM 612 stores static data and instructions that are needed by the one or more processing unit(s) 614 and other modules of the electronic system 600. The persistent storage device 602, on the other hand, may be a read-and-write memory device. The persistent storage device 602 may be a non-volatile memory unit that stores instructions and data even when the electronic system 600 is off. In one or more implementations, a mass-storage device (such as a magnetic or optical disk and its corresponding disk drive) may be used as the persistent storage device 602.

In one or more implementations, a removable storage device (such as a flash drive and its corresponding solid-state drive) may be used as the persistent storage device 602. Like the persistent storage device 602, the system memory 604 may be a read-and-write memory device. However, unlike the persistent storage device 602, the system memory 604 may be a volatile read-and-write memory, such as RAM. The system memory 604 may store any of the instructions and data that one or more processing unit(s) 614 may need at runtime. In one or more implementations, the processes of the subject disclosure are stored in the system memory 604, the persistent storage device 602, and/or the ROM 612. From these various memory units, the one or more processing unit(s) 614 retrieves instructions to execute and data to process in order to execute the processes of one or more implementations.

The persistent storage device 602 and/or the system memory 604 may include one or more machine learning models. Machine learning models, such as those described herein, are often used to form predictions, solve problems, recognize objects in image data, and the like. For example, machine learning models described herein may be used to predict the thermal demands of a vehicle battery pack along a certain part of a route of the vehicle. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 618 also connects to the input device interfaces 606 and output device interfaces 608. The input device interface 606 enables a user to communicate information and select commands to the electronic system 600. Input devices that may be used with the input device interface 606 may include, for example, alphanumeric keyboards, touch screens, and pointing devices. The output device interface 608 may enable the electronic system 600 to communicate information to users. For example, the output device interface 608 may provide the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 618 also connects to sensor(s) 610. The sensor(s) 610 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 610 may be utilized to detect movement, travel, and orientation of the electronic system 600. For example, the sensor(s) may include an accelerometer, a rate gyroscope, and/or other motion-based sensor(s). The sensor(s) 610 may include one or more biometric sensors and/or image sensors for authenticating a user.

The bus 618 also couples the electronic system 600 to one or more networks and/or to one or more network nodes through the one or more network interface(s) 616. In this manner, the electronic system 600 can be a part of a network of computers (such as a local area network or a wide area network). Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A vehicle management system, comprising:
   a measuring device that measures a transferred displacement between a drive unit and a wheel coupled to the drive unit; and
   a torque control configured to:
      obtain, from the measuring device, lash angle information corresponding to the transferred displacement between the drive unit and the wheel, and output, based on the lash angle information, torque shaping logic to the drive unit,
   wherein the measuring device is configured to measure the transferred displacement between the drive unit and the wheel when a vehicle is in a locked state and greater than a threshold amount of time has passed since the vehicle transitioned into the locked state and prior to the vehicle transitioning into a sleep state.

2. The vehicle management system of claim 1, wherein the measuring device is configured to measure the transferred displacement between the drive unit and the wheel between different key cycles.

3. The vehicle management system of claim 1, wherein the measuring device is configured to measure a difference between a first rotational angle of a shaft in the drive unit and a second rotational angle of the wheel coupled to the drive unit, wherein the measured difference corresponds to the transferred displacement between the drive unit and the wheel.

4. The vehicle management system of claim 1, wherein the torque control is configured to update the torque shaping logic with updated lash angle information between different key cycles.

5. The vehicle management system of claim 1, wherein the torque control is configured to:
store the lash angle information as historical lash angle information, wherein at least a portion of the stored lash angle information is associated with a first key cycle;
obtain updated measurements of the transferred displacement between the drive unit and the wheel during a second key cycle different than the first key cycle;
generate, based on the updated measurements and the historical lash angle information, a weighted average of the lash angle information; and
update, based on the weighted average of the lash angle information, the torque shaping logic to the drive unit.

6. The vehicle management system of claim 1, wherein the measuring device comprises a lash angle sensor configured to measure a position of a magnet mounted on a shaft in the drive unit and detect that the shaft has rotated a measured amount before the drive unit engages the wheel.

7. The vehicle management system of claim 1, wherein the vehicle management system is implemented in a vehicle.

8. A vehicle, comprising:
a front drive unit;
a rear drive unit;
a first measuring device that measures a first lash angle associated with the front drive unit;
a second measuring device that measures a second lash angle associated with the rear drive unit; and
a torque control configured to:
obtain first lash angle information corresponding to the measured first lash angle and second lash angle information corresponding to the measured second lash angle,
determine, based on the first lash angle information, a first torque shaping logic for the front drive unit,
determine, based on the second lash angle information, a second torque shaping logic for the rear drive unit, and
output the first torque shaping logic to the front drive unit and the second torque shaping logic to the rear drive unit.

9. The vehicle of claim 8, further comprising a first wheel coupled to the front drive unit, wherein the first torque shaping logic causes the front drive unit to operate the first wheel with a first adjustment in torque output of the front drive unit that corresponds to the measured first lash angle.

10. The vehicle of claim 9, further comprising a second wheel coupled to the rear drive unit, wherein the second torque shaping logic causes the rear drive unit to operate the second wheel with a second adjustment in torque output of the rear drive unit that corresponds to the measured second lash angle.

11. A method of managing a vehicle, the method comprising:
monitoring a transferred displacement between a drive unit and a wheel coupled to the drive unit;
measuring a lash angle corresponding to the transferred displacement between the drive unit and the wheel; and
sending, based on the measured lash angle, torque shaping logic to the drive unit,
wherein the measuring comprises measuring the transferred displacement between the drive unit and the wheel when a vehicle is in a locked state and greater than a threshold amount of time has passed since the vehicle transitioned into the locked state and prior to the vehicle transitioning into a sleep state.

12. The method of claim 11, wherein the transferred displacement between the drive unit and the wheel is monitored between different key cycles.

13. The method of claim 11, wherein the measuring comprises measuring a difference between a first rotational angle of a shaft in the drive unit and a second rotational angle of the wheel coupled to the drive unit, wherein the measured difference corresponds to the transferred displacement between the drive unit and the wheel.

14. The method of claim 11, further comprising updating the torque shaping logic with updated lash angle information between different key cycles.

15. The method of claim 11, further comprising:
storing lash angle information comprising the measured lash angle as historical lash angle information, wherein at least a portion of the stored lash angle information is associated with a first key cycle;
obtaining updated measurements of the transferred displacement between the drive unit and the wheel during a second key cycle different than the first key cycle;
generating, based on the updated measurements and the historical lash angle information, a weighted average of the lash angle information; and
updating, based on the weighted average of the lash angle information, the torque shaping logic to the drive unit.

16. The method of claim 11, wherein the measuring comprises:
measuring a position of a magnet mounted on a shaft in the drive unit, and
detecting that the shaft has rotated a measured amount before the drive unit engages the wheel.

17. The method of claim 11, wherein measuring the lash angle comprises calculating a weighted average lash angle by computing the lash angle over a number of iterations.

18. The method of claim 17, wherein measuring the lash angle comprises calculating a new lash angle between different key cycles based on the weighted average lash angle.

* * * * *